United States Patent [19]

Blair

[11] Patent Number: 5,538,061

[45] Date of Patent: * Jul. 23, 1996

[54] DUAL CHAMBER SAFETY TIRE

[76] Inventor: Johnny E. Blair, P.O. Box 16, Van, W. Va. 25206

[ * ] Notice: The portion of the term of this patent subsequent to Apr. 12, 2011, has been disclaimed.

[21] Appl. No.: 224,700

[22] Filed: Apr. 8, 1994

[51] Int. Cl.⁶ .................................................... B60C 5/22
[52] U.S. Cl. ....................... 152/342.1; 152/427; 152/429; 152/518
[58] Field of Search ................................ 152/518, 342.1, 152/429, 339.1, 427

[56] References Cited

U.S. PATENT DOCUMENTS

| | | | |
|---|---|---|---|
| 2,964,084 | 12/1960 | Tubbs | 152/429 |
| 3,247,882 | 4/1966 | Pratt | 152/429 |
| 4,293,017 | 10/1981 | Lambe | 152/518 X |
| 5,109,905 | 5/1992 | Lambe | 152/342.1 |
| 5,301,729 | 4/1994 | Blair | 152/518 X |

Primary Examiner—Michael W. Ball
Assistant Examiner—David W. Reed
Attorney, Agent, or Firm—George J. Neilan

[57] ABSTRACT

A dual chamber inflatable safety tire mounted on a rim, said tire having an outer tire with an inner tire disposed within the outer tire forming an outer chamber and inner chamber, a one way valve means extending through the inner tire to enable air flow from the outer chamber to the inner chamber, a first inflation and deflation valve means extending through the apparatus into the outer chamber, and a second inflation and deflation valve means extended through the apparatus into the inner chamber.

2 Claims, 1 Drawing Sheet

DUAL CHAMBER SAFETY TIRE

CROSS REFERENCE TO RELATED APPLICATION

This invention is related to my application No. 07/912, 748 filed Jul. 27, 1992, now U.S. Pat. No. 5,301,729.

1. Field of the Invention

The present invention relates to safety tires, i.e. tires that when punctured will not completely deflate and will provide the vehicle operator with improved operator control to reduce accidents and injuries. More specifically, the invention relates to dual chamber tubeless pneumatic safety tires for vehicles that have an inner tire to sustain the load of a vehicle when the outer tire has been punctured and has lost its air pressure.

2. Background of the Invention

A blowout of a conventional vehicle tire at high speed can cause a vehicle to go out of control and cause injury or death. If an immediate accident is avoided, a punctured tire may strand the operator on a highway or other unsafe place.

In order to minimize the danger in the event of a tire blowout or accidental deflation of a tire; various proposals have been made to prevent complete tire deflation and to provide the operator with additional vehicle control.

U.S. Pat. No. 3,025,902 discloses a dual chamber tubeless tire with an inner chamber inflated by a rim valve and an outer chamber inflated by a valve in the outer tire sidewall. In this device, if the outer chamber is inflated first, the inner diaphragm could be pressed inwardly to the rim to an unsafe position. Furthermore, if the rim valve developed a slow leak, the tire could separate from the rim while the outer tire remained fully inflated and appeared to be safe to drive on.

U.S. Pat. No. 2,871,904 discloses a dual chamber tubeless tire in which an inner chamber is inflated by a rim valve and an outer chamber is inflated along with the inner chamber via a first one way valve in the inner diaphragm. A second one way valve in the diaphragm permits air flow in the opposite direction, from the outer chamber to the inner chamber. In this tire, the vehicle operator cannot inflate, gauge or deflate the outer chamber directly,. Also, the operator cannot verify that the one way valves are working correctly or whether the inner diaphragm can sustain the vehicle load if the outer tire is punctured and loses its air pressure. Such faults might make a tire manufacturer responsible for the safe and correct wear of outer tire treads and for potentially unsafe conditions upon installation of the tire. Applicant theorizes that such concerns have kept such tires out of the market.

SUMMARY OF THE INVENTION

Briefly, my invention is an apparatus comprising a rim and a dual chamber inflatable safety tire mounted on the rim. The dual chamber safety tire has an outer tire with treads and a puncture resistant inner tire disposed within the outer tire forming an outer and inner chamber.

A first inflation and deflation valve means is extended through the apparatus into the outer chamber.

A second inflation and deflation valve means is extended through the apparatus into the inner chamber.

A one way valve means extends through the inner tire to provide for air flow from the outer chamber to the inner chamber so that first inflation and deflation valve means may inflate the outer chamber and inner chamber concurrently to equalize the inner and outer chamber air pressures thereby preventing the outer chamber air pressure from deforming the inner tire inwardly to the rim to an unsafe position when the operator inflates the outer chamber before inflating the inner chamber.

The first and second inflation and deflation valve means provide for direct and independent measurement of air pressure in both the inner and outer chambers whereby the operator can be responsible for the correct wear of the outer tire treads and be responsible to inflate the inner chamber to a higher air pressure than the outer chamber air pressure to verify that the inner chamber is not leaking air pressure and the inner tire will sustain the vehicle load after the outer tire has been punctured or blown-out and to verify that the apparatus should be repaired or replaced if the inner chamber air pressure cannot be maintained at a higher air pressure than the outer chamber air pressure.

DETAILED DESCRIPTION OF THE INVENTION

Figure 1:
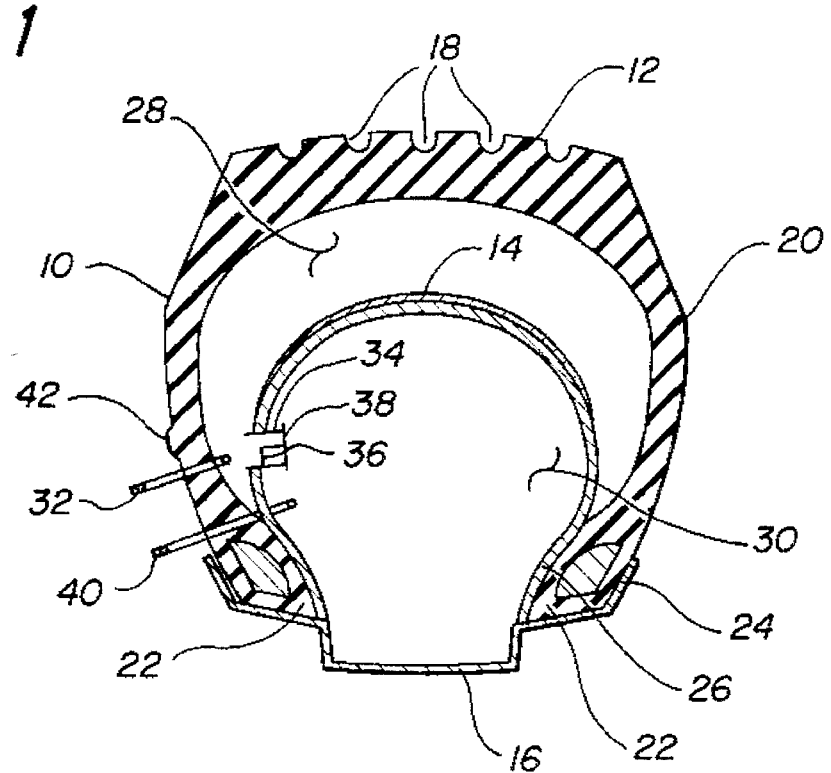
FIG. 1 is a fragmentary cross-sectional view in elevation of the first embodiment of my invention.

FIG. 1, illustrates a dual chamber inflatable safety tire 10 mounted on a rim 16. Safety tire 10 having an outer tire 12 and an inner tire 14.

Outer tire 12 is made of conventional material and has treads 18 for engagement with a roadway and has sidewalls 20 with peripheral edges 22 of increased thickness that are secured within outwardly flaring walls 24 of rim 16.

Inner tire 14 is made puncture resistant with conventional material and has peripheral edges 26 attached to the inward sides of sidewalls 20. An outer chamber 28 is formed between outer tire 12 and inner tire 14. An inner chamber 30 is formed between inner tire 14 and rim 16.

A first inflation and deflation valve means 32 extends through sidewalls 20 into outer chamber 28, thereby the operator can be responsible to directly inflate and deflate outer chamber 28 to the correct air pressure so treads 18 will wear correctly.

A second inflation and deflation valve means 40 extends through outer tire 12 and inner tire 14 into inner chamber 30, thereby the operator can be responsible to inflate inner chamber 30 to a higher air pressure than outer chamber 28 to verify that inner chamber 30 is not leaking air pressure and that inner tire 14 will sustain the vehicle load when outer tire 12 gets punctured or blown-out.

A one way valve means 34 extends through inner tire 14 into inner chamber 30 to provide for air flow from outer chamber 28 to inner chamber 30 to enable first inflation and deflation valve means 32 to inflate both the outer chamber 28 and inner chamber 30 concurrently to equalize outer chamber 28 and inner chamber 30 air pressures thereby preventing outer chamber 28 air pressure from pressing inner tire 14 inward to rim 16 to an unsafe position when the operator inflates outer chamber 28 before inflating inner chamber 30.

One way valve means 34 includes a tension spring 36 which normally biases a closure member 38 to a close position. One way valve means 34 allows air flow from outer chamber 28 to inner chamber 30 when air pressure in outer chamber 28 is greater than air pressure in inner chamber 30 and the differential overcomes the bias of spring 36. When inner chamber 30 air pressure is greater than outer chamber 28 air pressure, tension spring 36 bias will close the closure member 38 and retain inner chamber 30 air pressure separate from the air pressure in outer chamber 28.

Second inflation and deflation valve means 40 enables the operator to inflate inner chamber 30 directly and independently of the pressure in outer chamber 28. When inflation and deflation valve means 40 is used to deflate inner chamber 30 and the air pressure therein is reduced to below the air pressure in outer chamber 28; one way valve means 34 will open and further deflation via inflation and deflation valve means 40 will reduce the air pressure in both the inner chamber 30 and outer chamber 28 equally, thereby eliminating the potential danger of the inner chamber 30 being under inflated while outer chamber 28 was fully inflated which could cause tire 10 to separate from rim 16 which could cause a vehicle accident with injuries.

When an operator cannot maintain a higher air pressure in inner chamber 30 than in outer chamber 28, this verifies that safety tire 10 has a defect allowing air pressure to leak from inner chamber 30 and inner tire 14 will not sustain the vehicle load after outer tire 12 is punctured or blown-out and verifies that safety tire 10 should be repaired or replaced.

It should be noted that the invention provides means for the operator to be responsible to directly and independently inflate, gauge and deflate outer chamber 28 to a correct air pressure so that treads 18 will wear correctly, and for the operator to directly and independently inflate inner chamber 30 to a higher air pressure than outer chamber 28 to verify that inner chamber 30 is not leaking air pressure and inner tire 14 will support the vehicle load when outer tire 12 is punctured or has a blow-out, and provides means to prevent the outer chamber 28 pressure from pressing inner tire 14 inward to rim 16 to an unsafe position when the operator inflates the outer chamber 28 before inflating inner chamber 30, thereby reducing the operator's potential danger and reducing a tire manufacturer's potential liability.

Indicia 42 is provided on sidewalls 20 to recommend appropriate air pressures for outer chamber 28 and inner chamber 30.

It is to be understood that for the size and safety of safety tire 10 being made, valves 32, 34, and 40 can be made any conventional way, first inflation and deflation valve means 32 can be extended through any portion of safety tire 10 or rim 16 into the outer chamber 28, second inflation and deflation valve means 40 can be extended through any portion of safety tire 10 or rim 16 into the inner chamber 30.

Figure 2:
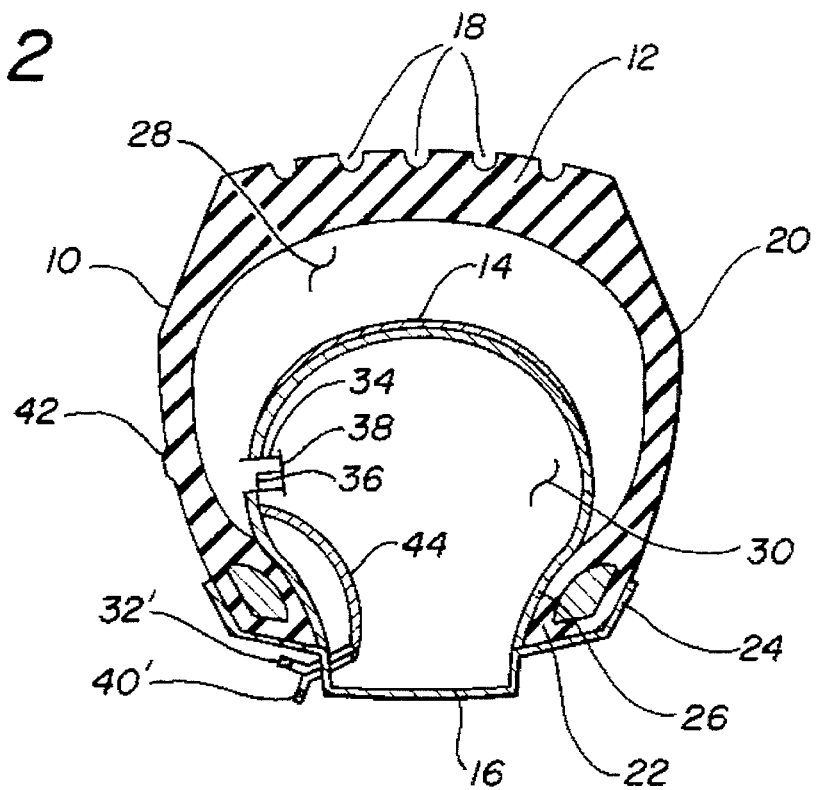
FIG. 2 is a fragmentary cross-sectional view in elevation of the second embodiment of my invention.

FIG. 2 illustrates another embodiment of the present invention. Like reference numerals designate like parts in FIGS. 1 and 2.

FIG. 2 is the same as FIG. 1 but showing a modification wherein a first inflation and deflation valve means 32' extends through rim 16 into chamber 30 and has tubular extension 44 that extends through chamber 30 and inner tire 14 into outer chamber 28, and a second inflation and deflation valve means 40' is extended through rim 16 into inner chamber 30.

Having described my invention,
I claim:
1. Apparatus comprising a rim and a dual chamber inflatable safety tire mounted on said rim, said tire comprising an outer tire having treads for engagement with a roadway, an inner tire disposed within said outer tire forming an outer chamber between said outer tire and said inner tire and forming an inner chamber between said inner tire and said rim, a first inflation and deflation valve means extending through said outer tire into said outer chamber to enable an operator to measure and thereby be responsible for the correct air pressure in said outer chamber and the correct wear of said treads, a second inflation and deflation valve means extending through said outer tire and said inner tire into said inner chamber to enable an operator to measure and thereby be responsible for the inflation of said inner chamber to a higher air pressure than said outer chamber and to enable deflation of both said inner chamber and said outer chamber, a one way valve means extending through said inner tire to provide for air flow from said outer chamber to said inner chamber so that said first inflation and deflation valve means may inflate said outer and inner chambers concurrently to equalize pressures thereby preventing said outer chamber air pressure from pressing said inner tire inward to said rim to an unsafe position when the operator inflates said outer chamber before inflating said inner chamber, said first and second inflation and deflation valve means providing means to provide for direct and independent measurement of air pressure in said inner and outer chambers whereby the inability to maintain a higher air pressure in said inner chamber than in said outer chamber verifies said apparatus is leaking air pressure and should be repaired or replaced.

2. Apparatus comprising a rim and a dual chamber inflatable safety tire mounted on said rim, said tire comprising an outer tire having treads for engagement with a roadway, an inner tire disposed within said outer tire forming an outer chamber between said outer tire and said inner tire and forming an inner chamber between said inner tire and said rim, a first inflation and deflation valve means extending through said rim and said inner tire into said outer chamber to enable an operator to measure and thereby be responsible for the correct air pressure in said outer chamber and the correct wear of said treads, a second inflation and deflation valve means extending through said rim into said inner chamber to enable an operator to measure and thereby be responsible for the inflation of said inner chamber to a higher air pressure than said outer chamber and to enable deflation of both said inner chamber and said outer chamber, a one way valve means extending through said inner tire to provide for air flow from said outer chamber to said inner chamber so that said first inflation and deflation valve means may inflate said outer and inner chambers concurrently to equalize pressures thereby preventing said outer chamber air pressure from pressing said inner tire inward to said rim to an unsafe position when the operator inflates said outer chamber before inflating said inner chamber, said first and second inflation and deflation valve means providing means to provide for direct and independent measurement of air pressure in said inner and outer chambers whereby the inability to maintain a higher air pressure in said inner chamber than in said outer chamber verifies said apparatus is leaking air pressure and should be repaired or replaced.

\* \* \* \* \*